UNITED STATES PATENT OFFICE.

EDOARDO MARAGLIANO, OF GENOA, ITALY.

PROCESS OF PREPARING MEAT-MEAL.

No. 798,138.          Specification of Letters Patent.          Patented Aug. 29, 1905.

Application filed August 20, 1904. Serial No. 221,549.

*To all whom it may concern:*

Be it known that I, EDOARDO MARAGLIANO, a subject of the King of Italy, residing at Genoa, Italy, have invented certain new and useful Improvements in Processes for Preparing an Unalterable Meat-Meal, of which the following is a full and complete specification.

This invention relates to a new manufacture of meat powder or meal constituting an unalterable compact natural food composed of pure meat without admixture of chemical ingredients and differing from all known meat powders heretofore used for medical purposes.

The said manufacture is carried out by the following process:

A suitable quantity of meat is separated from the fat and bone and is finely divided by suitable known machinery, whereupon it is introduced into a vessel immersed in hot water, and in this water-bath it is heated to the desired degree under a continuous mechanical agitation without being exposed to the direct action of fire, so as to prevent the meat from being roasted or burned. The watery particles thus separated by evaporation are collected and condensed, whereupon the meat, thus completely separated, is cooled for about twenty-four hours in a completely dry and antiseptic chamber. The small pieces of perfectly dry meat thus obtained are ground by any suitable means to powder or meal in a similar manner to grain, and the meal thus obtained is spread in thin layers on plates in a closed chamber containing calcium chlorid, sulfuric acid, or other substances adapted to absorb the moisture contained in the atmosphere or meat-meal. Over the meat-meal thus obtained, in order to give it a fine aromatic flavor, the essence extracted and condensed during the sterilization may be sprinkled, whereupon the meal is introduced into suitable vessels or autoclaves for effecting the final sterilization, and it may then be canned or filled in commercial glass or porcelain jars or bottles, where it can be kept in an unaltered condition for un unlimited length of time. The product thus obtained may be used exactly as ordinary meat, also in combination with condensed and pulverized vegetables, also for soups or other dishes like ordinary meat extracts, with the difference that the new meal has retained in it all the nutritive constituents and has the flavor of fresh meat. When used for beef-tea, broth, or bouillon, a precipitate or deposit is obtained which is very rich in nutritive materials and is adapted for meat-pudding, fagots, sauces, &c.

By the above-described process a new product is obtained which combines the advantages of fresh meat with the capability of being stored for an unlimited length of time and which is of very small volume. It can also be mixed with other foods, such as corn flour or meal, so as to form bread or other food having the highly-nutritive qualities of fresh meat.

Having now fully described my invention and the manner in which the same is to be performed, I declare that what I claim, and desire to secure by Letters Patent, is—

1. The process of producing sterilized dehydrated meat containing the constituents of the natural aroma which consists in (*a*) separating the meat from the fat and bony structure, if any, (*b*) treating such meat in a closed vessel immersed in a heated liquid or vapor, (*c*) collecting and condensing the vapor arising therefrom, (*d*) removing the sterilized meat and cooling it in a dry antiseptic chamber, (*e*) reducing the meat to powder, (*f*) dehydrating the meat in a closed chamber containing a hydroscopic substance, and (*g*) mixing such sterilized dehydrated meat with the condensate obtained from the condensed cooking vapor, substantially as described.

2. The process of producing sterilized dehydrated meat containing the constituents of the natural aroma which consists in (*a*) separating the meat from the fat and bony structure, if any, (*b*) treating such meat in a closed vessel immersed in a heated liquid or vapor, (*c*) collecting and condensing the vapor arising therefrom, (*d*) removing the sterilized meat and cooling it in a dry antiseptic chamber, (*e*) reducing the meat to powder, (*f*) dehydrating the meat in a closed chamber containing hydroscopic substance, (*g*) mixing such sterilized dehydrated meat with the condensate obtained from the condensed cooking vapor, and (*h*) finally sterilizing the mixed product, substantially as described.

In witness whereof I have hereunto set my hand in the presence of two witnesses.

EDOARDO MARAGLIANO.

Witnesses:
  RAY LUIGILEUH,
  ANGELO BORAGINO.